United States Patent [19]

Klimo

[11] 4,069,445
[45] Jan. 17, 1978

[54] BYPASS CONTROL FOR A SOLID STATE SWITCHING DEVICE

[75] Inventor: Robert G. Klimo, Parma, Ohio

[73] Assignee: Towmotor Corporation, Mentor, Ohio

[21] Appl. No.: 626,504

[22] Filed: Oct. 28, 1975

[51] Int. Cl.² ............................................. H02P 7/28
[52] U.S. Cl. .................................... 318/139; 318/341
[58] Field of Search ............................... 318/139, 341

[56] References Cited
U.S. PATENT DOCUMENTS

| | | | |
|---|---|---|---|
| 3,764,870 | 10/1973 | Morton et al. | 318/341 X |
| 3,936,707 | 2/1976 | Yoshida et al. | 318/139 |
| 3,968,414 | 7/1976 | Konrad | 318/139 X |

Primary Examiner—B. Dobeck
Assistant Examiner—W. E. Duncanson, Jr.
Attorney, Agent, or Firm—Phillips, Moore, Weissenberger, Lempio & Majestic

[57] ABSTRACT

A bypass control for shorting out a silicon controlled rectifier (SCR) control circuit so that full battery potential can be applied to a direct current motor. The bypass control has a timing circuit for delaying closing of the bypass contacts. This timing circuit is disabled in the event the main SCR is defective and will not turn on, and also in the event the motor is plugging. In the event the bypass contacts weld closed, the control will prevent further operation of the motor.

14 Claims, 1 Drawing Figure

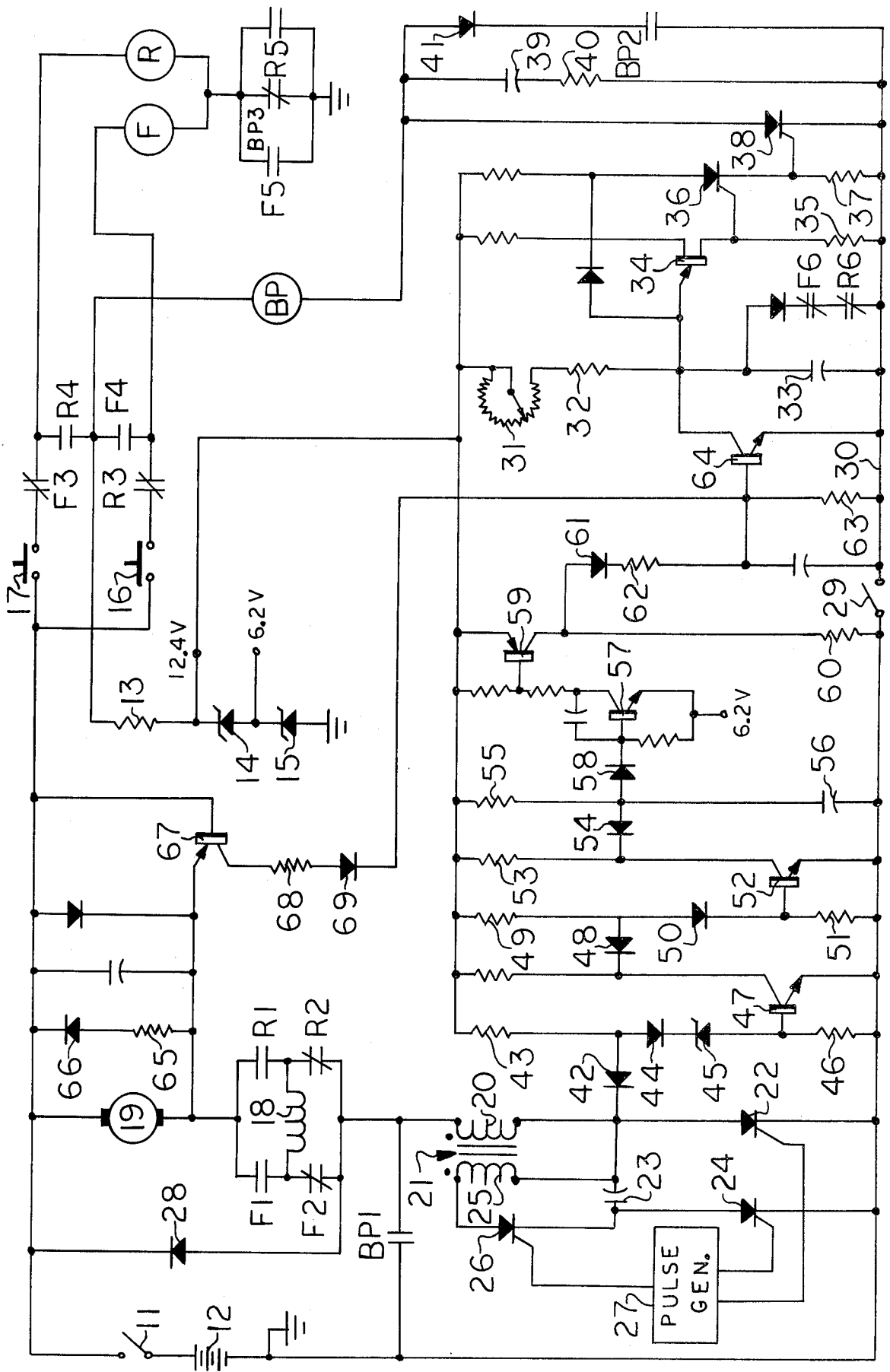

BYPASS CONTROL FOR A SOLID STATE SWITCHING DEVICE

BACKGROUND OF THE INVENTION

This invention is related to a control for direct current motors utilizing silicon controlled rectifiers (SCR's) to supply power to the motor and in particular to a circuit for bypassing the SCR control so that full battery potential may be applied to the motor.

It is well known that the direct current supplied to a motor from a constant potential power source such as a battery may be selectively varied by controlling the average power supplied to the motor, and that a solid state SCR can be used as a switching device to repeatedly connect and disconnect the battery to and from the motor. The power supplied to the motor is determined by a ratio between the time the SCR is turned on and conducts and the time that the SCR is turned off and is non-conducting.

Increasing the ratio of on-time to off-time will increase the power delivered through the SCR to the motor. However, even if this ratio is maximum, i.e., with the SCR conducting continuously, the full power available from the battery will not be delivered to the motor since some power will be consumed by the SCR and the circuitry for turning the SCR on and off. In addition, an SCR which can remain full-on and withstand the high currents present during such operations as ramp starts is very expensive.

As a consequence, SCR motor control circuits are generally provided with bypass contacts which may be closed to shunt out the SCR control and connect the terminals of the motor directly across the battery. With the SCR control thus shorted out, the full available power from the battery can be utilized for driving the motor, and a smaller and cheaper main SCR can be used in the SCR control.

Various safeguards should be incorporated into a bypass control. For example, in vehicle propulsion systems, the switch that actuates the bypass contact is typically operated by the foot-controlled accelerator pedal, and closes when the pedal is fully depressed. In normal driving operation, the operator may inadvertently and momentarily depress the pedal fully, which will close the bypass switch, at a time when he does not wish to go into bypass mode. Accordingly, the bypass control should operate only when the operator really intends it to operate.

Further the bypass control should be automatically disabled in case the main SCR fails to conduct. If the main SCR fails to conduct, the accelerator pedal can be depressed without causing any vehicle movement. If the bypass contacts then close around a defective main SCR, full power would then be applied to a stationary vehicle and dangerous lurching will occur.

Additionally, the bypass control should be inoperative during a plugging operation, i.e., when the field has been reversed so that the motor is acting as a generator to brake the vehicle, since application of full power to the motor during braking could cause a dangerously abrupt halt of the vehicle.

Also, in the event that the bypass contacts should weld closed, the bypass control should prevent further vehicle operation until the defective contacts have been replaced.

SUMMARY OF THE INVENTION

The present invention provides a control which will enable the SCR motor control circuit to be bypassed, and which provides the desirable safeguards enumerated above.

To prevent premature bypassing, a time delay is provided so that the bypass contacts will not close until the bypass switch has been closed for a predetermined time period. In order to go into bypass mode, the operator must consciously hold the foot pedal fully depressed for that time period.

To prevent closing of the bypass contacts around a defective main SCR, the anode voltage of the main SCR is continuously monitored and applied to a timing circuit. If the main SCR is functioning properly, the timer circuit is disabled. If the main SCR initially, or later, fails to turn on at the proper time, the timing circuit will time out and disable the bypass control so that it will not be able to close the bypass contacts.

Similarly, if the motor is plugging, plug current is sensed and a disabling voltage is applied to the bypass control.

The bypass relay is provided with an auxiliary set of normally closed contacts which allow the direction relays, which connect the field to the armature, to be energized. If the main bypass contacts are welded closed, the auxiliary bypass contacts will be held open so that the field cannot be reconnected to the armature.

Other objects and advantages of the present bypass control will become apparent in the course of the following detailed description.

BRIEF DESCRIPTION OF THE DRAWING

The single FIGURE illustrates an SCR control for a direct current motor utilizing the bypass control of the present invention.

DESCRIPTION OF THE PREFERRED EMBODIMENT

Referring now to the drawing, wherein is shown a preferred embodiment of the invention, main switch 11 enables a source of direct current, e.g., battery 12, to be connected to the circuit. Direction switches 16 and 17 are provided to alternatively energize one of the forward (F) or reverse (R) relay coils, to connect the field winding 18 in series with the armature 19. For example, if forward switch 16 is closed, it will complete an energizing path for the forward relay coil F through switch 16, normally closed contacts $R_3$ and normally closed contacts $BP_3$. When the forward relay coil F is energized it will close and open its main contacts $F_1$ and $F_2$, respectively, to connect the field winding in series with the armature. Current can also flow through the now closed contacts $F_4$ and through resistor 13 and zener diodes 14 and 15 to develop regulated +12.4 and +6.2 voltages to power the control circuits described below.

Upon closure of main switch 11 and one of the direction switches 16 or 17, current can flow from the battery through the armature and field winding, primary 20 of pulse transformer 21 and the main silicon controlled rectifier (SCR) 22 and back to the battery.

Commutating capacitor 23 is connected in series with commutating SCR 24; the capacitor and SCR 24 being in parallel with the main SCR 22. A charging path for capacitor 23 is provided by the loop comprised of capacitor 23, the secondary 25 of pulse transformer 21 and the charging SCR 26.

In operation, gate pulses are applied to the gates of the main and charging SCR's 22 and 26 from pulse generator 27. With the main SCR gated on, current will flow through the motor and the primary of pulse transformer 21, inducing current flow in the secondary 25 which will flow through SCR 26 to charge the commutating capacitor 23 so that its right plate is charged negatively relative to its left plate. When the capacitor is fully charged SCR 26 will commutate.

Subsequently, a pulse is applied from pulse generator 27 to gate on the commutating SCR 24 so that the commutating capacitor is connected across the main SCR and so that the charge on the capacitor will cause the main SCR to commutate. Current through the motor is maintained during the off-time of the main SCR means of flyback diode 28.

The power delivered through the main SCR 22 to the motor will vary with the ratio of on-time to off-time of the main SCR 22. This ratio can be varied by varying the frequency at which the main SCR is gated on while maintaining the on-time (i.e., the time interval between gating the main SCR on and gating the commutating SCR on) constant, or by gating the main SCR on at a constant rate and varying the length of the on-time, or by varying both. Typically, the ratio of on-time to off-time is varied by a potentiometer coupled to the foot-operated accelerator pedal on the vehicle propelled by the motor.

The main SCR 22 and the pulse transformer 21 both introduce some resistance into the motor circuit and thus full battery potential cannot be applied to the motor through the main SCR. In the event the operator wishes to apply full power to the motor he can do so by closing bypass switch 29 (typically coupled to the accelertor pedal for actuation when the pedal is fully depressed). By means described below, this will energize the bypass relay coil BP, causing its main bypass contacts $BP_1$ to close, shorting out the SCR control circuit and connecting the motor directly across the battery.

It is desirable not to close the main bypass contacts immediately upon closing of bypass switch 29, but instead to provide a short delay so that the operator must hold the foot pedal fully depressed for a finite time before bypass is accomplished. This will prevent inadvertent bypassing if the operator should only depress the foot pedal momentarily.

Closure of bypass switch 29 connects the negative bus 30 of the bypass control circuit to ground, i.e., the negative terminal of battery 12. Current can now flow from the +12.4 volt source through the timing circuit comprised of trimmer potentiometer 31, resistor 32 and timing capacitor 33. When the capacitor charges sufficiently, it will turn on unijunction transistor 34, causing it to conduct through resistor 35. The voltage developed thereacross will gate on a small SCR 36, in turn causing current to flow through resistor 37 to gate on a larger SCR 38. Current can now flow from the battery through, e.g., closed direction switch 16, normally closed contacts $R_3$, now closed contacts $F_4$, by bypass relay coil BP, and SCR 38 to energize the bypass relay coil. The auxiliary bypass contacts $BP_2$ close to provide a holding circuit through diode 41 to maintain the bypass relay coil energized and commutate SCR 38 by shunting the current through relay coil BP around SCR 38. Capacitor 39 and resistor 40 limit the rate of voltage rise across SCR 38.

The bypass relay coil BP will remain energized until such time as either the bypass switch 29 is opened or the direction switch 16 is opened. The upper plate of timing capacitor 33 is connected to ground through the normally closed contacts $F_6$ and $R_6$ of the direction relays and thus the timing capacitor will be reset any time both direction relays F and R are de-energized.

The present circuit includes means to prevent the bypass contacts from closing in the event that the main SCR has failed to turn on. In such case, the chopper circuit will be defective and no current will be delivered to the motor and the vehicle will remain stationary during the otherwise normal SCR phase of operation. If the main by-pass contacts $BP_1$ should now close around the defective main SCR, full power would suddenly be applied to the motor and the stationary vehicle would lurch.

The anode of the main SCR 22 is connected by diode 42 to the junction between resistor 43 and diode 44, diode 44 being connected by zener diode 45 and resistor 46 to ground. When the main SCR 22 is off, its anode voltage is high. Transistor 47 will conduct and its collector potential will be low. If SCR is conducting, its anode potential will go low, grounding the bottom of resistor 43 and turning transistor 47 off so that its collector voltage goes high. Diode 48 couples the collector voltage of transistor 47 to a logic inverter comprised of resistor 49, diode 50, resistor 51, transistor 52 and resistor 53. The collector of transistor 52 will thus be high when the anode of the main SCR 22 is high (i.e., when non-conducting), and low when the main SCR is conducting.

The collector of transistor 52 is coupled by diode 54 to a timing circuit comprised of resistor 55 and capacitor 56. The values of resistor 55 and capacitor 56 are chosen so that the time required for capacitor 56 to charge to a level sufficient to turn transistor 57 on through diode 58 is longer than the longest off-time period of normal operation of the main SCR. Thus, if the main SCR is functioning properly, the timing capacitor 56 will be discharged through diode 54 and transistor 52 each time the main SCR conducts, and transistor 57 will not be turned on. However, if the main SCR fails to turn on when it should, capacitor 56 can charge to a level sufficient to turn transistor 57 on. This in turn causes transistor 59 to conduct. The potential across resistor 60 causes current to flow through diode 61 and resistors 62 and 63 so that the base of transistor 64 is raised to turn it on. With transistor 64 conducting, the timing capacitor 33 is shorted to ground so that it cannot charge and turn on the unijunction transistor 34. As a consequence the bypass relay coil BP cannot be energized. To ensure against improper functioning, the time delay of the timing circuit of capacitor 33 should be longer than the time period required for timing capacitor 56 to turn on transistor 57.

The present circuit also prevents the main bypass contacts from closing in the event the motor is plugging, i.e., acting as a generator to brake the moving vehicle. Plugging will occur if the vehicle is moving forwardly and the forward direction switch 16 is opened and the reverse switch 17 is closed. The forward relay coil F will be de-energized and the reverse relay coil R will be energized so that their main contacts $F_1$, $F_2$, $R_1$ and $R_2$ will reverse the connection of the field winding to the armature. Plug current will now flow through resistor 65 and plug diode 66, developing a voltage thereacross, which voltage is used to turn transistor 67 on. Current can now flow through transistor 67, resistor 68 and diode 69 to the junction of resistor 63 and the base of transistor 64. This current flow turns transistor 64 on to short out timing capacitor 33 so that unijunction transistor 34 cannot conduct. Thus, if the motor is plugging and the bypass switch 29 is closed, the bypass coil BP cannot be energized.

Since the main bypass contacts $BP_1$ carry the full load current and must break this full current when coming out of the bypass mode, arcing at the contacts can occur. In extreme situations, the arcing may be sufficiently severe as to weld the contacts closed. The present circuit provides protection against continued vehicle operation in case the bypass contacts are welded closed.

In the normal start-up operation, the bypass relay BP is de-energized, and its auxiliary contacts $BP_3$ are closed. These contacts are in the energizing path for the directional relay coils F and R so that the desired relay can be energized. Once energized, its auxiliary contact $F_5$ or $R_5$ will close in parallel to the $BP_3$ contacts to provide a holding circuit for the relay even if the vehicle is accelerated to the bypass mode and the auxiliary bypass contacts $BP_3$ open.

If the bypass coil is de-energized but its contacts do not restore, as would be the case if the main contacts $BP_1$ are welded closed, the motor will continue to operate in bypass mode until the operator opens the closed direction switch or opens the master switch 11. In either event the energized directional relay will be de-energized so that its auxiliary contact $F_5$ or $R_5$ reopens.

The operator cannot now restart operations. Even though the bypass coil BP is de-energized, the welded-closed main contacts $BP_1$ will maintain the auxiliary contacts $BP_3$ open so that the direction relay coils F and R cannot be re-energized, and the field winding 18 will be disconnected from the armature to prevent current flow therethrough. Operations can only be restarted after the defective bypass contacts have been replaced.

What is claimed is:

1. In a system for controlling the power delivered from a source of direct current to a load including a silicon controlled rectifier connected in series with said source of direct current and said load, a pulse generator for repeatedly gating the silicon controlled rectifier into conduction at a controlled rate, a commutation circuit for commutating the silicon controlled rectifier at a controlled time after the silicon controlled rectifier is gated into conduction, a by-pass relay having main contacts for connecting said load directly to said source of direct current when said relay is energized, the improvement comprising:
   a. a circuit for energizing said bypass relay,
   b. means responsive to the state of conduction of said silicon controlled rectifier for disabling said circuit (a) in the event said silicon controlled rectifier fails to be gated into conduction by said pulse generator.

2. In a system as set forth in claim 1, wherein:
   said means (b) includes a timer having a time period greater than the longest time between a commutation of said silicon controlled rectifier by said commutation circuit and the next time that said silicon controlled rectifier is gated by said pulse generator,
   said means (b) further including means responsive to the state of conduction of said silicon controlled rectifier for allowing said timer to operate when said silicon controlled rectifier is not conducting,
   said means (b) further includes means responsive to the state of conduction of said silicon controlled rectifier for resetting said timer each time said silicon controlled rectifier is gated into conduction,
   said means (b) further including means responsive to operation of said timer for said time period without resetting for disabling said circuit (a).

3. In a system as set forth in claim 1, wherein:
   said means (b) includes a source of voltage and a resistor and a capacitor connected in series across said voltage, said capacitor requiring a predetermined time period to charge from a discharged state to a predetermined voltage thereacross, said predetermined time period being greater than the longest time from commutation of said silicon controlled rectifier and the next time that said silicon controlled rectifier is gated by said pulse generator,
   said means (b) further including means responsive to the state of conduction of said silicon controlled rectifier for allowing said capacitor to charge when and during the time said silicon controlled rectifier is not conducting and for discharging said capacitor when and during the time said silicon controlled rectifier is conducting,
   said means (b) further including means responsive to charging of said capacitor to said predetermined voltage thereacross for disabling said circuit (a).

4. In a system as set forth in claim 1, wherein:
   said circuit (a) includes a timer having a time period,
   said circuit (a) further includes means responsive to operation of said timer for said time period for energizing said bypass relay,
   and wherein said means (b) disables said circuit (a) by resetting said timer and maintaining said timer reset in the event said silicon controlled rectifier fails to be gated into conduction by said pulse generator.

5. In a system as set forth in claim 4, wherein said load is a motor having a field and an armature, wherein there is a direction relay having main contacts to connect the field and armature in series, and an energizing circuit for said direction relay, the improvement further comprising:
   said direction relay having auxiliary contacts actuated from a first position to a second position when said relay is energized,
   means responsive to the position of said auxiliary contacts for resetting said timer and maintaining said timer reset when said contacts are in their first position.

6. In a system as set forth in claim 4, wherein said load is a motor having a field and an armature and wherein said system includes means for reversing the connection of said field to said armature whereby plug current may be generated, the improvement further comprising:
   means for detecting the presence of plug current,
   means responsive to the detection of plug current for resetting said timer and maintaining said timer reset during the presence of plug current.

7. In a sustem as set forth in claim 1, wherein:
   said means (a) includes a source of voltage and a resistor and a capacitor connected in series across said voltage, said capacitor requiring a predetermined time period to charge from a discharged state to a predetermined voltage thereacross,
   said means (b) includes means for discharging said capacitor and maintaining said capacitor discharged in the event said silicon controlled rectifier fails to be gated into conduction by said pulse generator.

8. In a system as set forth in claim 7, wherein said load is a motor having a field and an armature, wherein there is a direction relay having main contacts for connecting the field and armature in series, and an energizing circuit for said direction relay, the improvement further comprising:
said direction relay having auxiliary contacts actuated from a first position to a second position when said relay is energized,
means responsive to the position of said auxiliary contacts for discharging said capacitor when said contacts are in their first position.

9. In a system as set forth in claim 7, wherein said load is a motor having a field and an armature and wherein said system includes means for reversing the connection of said field to said armature whereby plug current may be generated, the improvement further comprising:
means for detecting the presence of plug current,
means responsive to the detection of plug current for discharging said capacitor and maintaining said capacitor in discharged state during the presence of plug current.

10. In a system as set forth in claim 7, wherein:
said means (b) includes a timer actuated in response to a state of non-conduction of said silicon controlled rectifier and reset in response to a state of conduction of said silicon controlled rectifier, said timer having a time period greater than the longest time from commutation of said silicon controlled rectifier until the next time said silicon controlled rectifier is gated by sid pulse generator,
said means (b) further including means responsive to operation of said timer of means (b) for the time period thereof for discharging the capacitor of means (a),
and wherein the time period of means (a) is longer than the time period of means (b).

11. In a system as set forth in claim 7, wherein:
said means (b) includes a source of voltage and a resistor and capacitor connected in series across said voltage, said capacitor requiring a predetermined time period to charge from a discharged state to a predetermined voltage thereacross, said predetermined time being greater than the longest time from commutation of said silicon controlled rectifier until the next time said silicon controlled rectifier is gated by said pulse generator,
said means (b) further including means responsive to the state of conduction of said silicon controlled rectifier for allowing said capacitor to charge when and during the time said silicon controlled rectifier is not conducting and for discharging said capacitor when and during the time said silicon controlled rectifier is conducting,
said means (b) further including means responsive to the charging of said capacitor to said predetermined voltage for discharging the capacitor of means (a),
said time period of said means (a) being longer than the time period of said means (b).

12. In a system as set forth in claim 1 wherein said load is a motor having a field and an armature, wherein there is a direction relay having main contacts to connect the field and armature in series, and an energizing circuit for said direction relay, the improvement further comprising:
said direction relay having normally open auxiliary contacts in said energizing circuit,
said bypass relay having normally closed auxiliary contacts connected in parallel with said auxiliary contacts of said direction relay.

13. In a system for controlling the power delivered from a source of direct current to a motor having a field and an armature including a silicon controlled rectifier connected in series with said source of direct current and said load, a pulse generator for repeatedly gating said silicon controlled rectifier into conduction at a controlled rate, a commutation circuit for commutating the silicon controlled rectifier at a controlled time after the silicon controlled rectifier is gated into conduction, a bypass relay having main contacts for connecting said motor directly to said source of direct current, a direction relay having main contacts for connecting said field to said armature, and an energizing circuit for said direction relay, the improvement comprising:
a. normally open auxiliary contacts of said direction relay in said energizing circuit and in series with said direction relay,
b. normally closed auxiliary contacts of said bypass relay connected in parallel with said auxiliary contacts of said direction relay, whereby said energizing circuit to said direction relay is completed only through said auxiliary contacts of said bypass and direction relays.

14. In a system as set forth in claim 13 including a second direction relay having main contacts for connecting the field to the armature in a reverse direction from that in which the first direction relay connects the field to the armature, and an energizing circuit for said second direction relay, the improvement further comprising:
c. normally open auxiliary contacts of said second direction relay in said energizing circuit for said second direction relay and in series with said second direction relay,
said normally closed auxiliary contacts of said bypass relay being connected in parallel with said auxiliary contacts of said second direction relay, whereby said energizing circuit to said second direction relay is completed only through said auxiliary contacts of said bypass and second direction relays.

* * * * *